(12) United States Patent
Bungenstock et al.

(10) Patent No.: US 10,018,314 B2
(45) Date of Patent: Jul. 10, 2018

(54) LIGHTING DEVICE FOR VEHICLES

(71) Applicant: Hella KGaA Hueck & Co., Lippstadt (DE)

(72) Inventors: Carmen Bungenstock, Kleinenberg (DE); Christoph Geister, Lippstadt (DE); Martin Mügge, Geseke (DE); Heinrich Schäfer, Bad Wünnenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/875,008

(22) Filed: Jan. 19, 2018

(65) Prior Publication Data

US 2018/0142851 A1 May 24, 2018

Related U.S. Application Data

(60) Continuation of application No. 15/441,309, filed on Feb. 24, 2017, which is a division of application No.
(Continued)

(30) Foreign Application Priority Data

Apr. 25, 2013 (DE) .................. 10 2013 104 174

(51) Int. Cl.
*F21V 9/00* (2018.01)
*F21S 41/10* (2018.01)
(Continued)

(52) U.S. Cl.
CPC ............ *F21S 41/10* (2018.01); *B60Q 1/0011* (2013.01); *B60Q 1/38* (2013.01); *B60Q 3/66* (2017.02);
(Continued)

(58) Field of Classification Search
CPC .. B60Q 1/011; B60Q 3/66; F21S 41/24; F21S 41/26
See application file for complete search history.

(56) References Cited

U.S. PATENT DOCUMENTS

2009/0027911 A1 1/2009 Misawa et al.
2010/0027256 A1 2/2010 Kinoshita

FOREIGN PATENT DOCUMENTS

DE 10022420 A1 11/2001
DE 10022779 A1 11/2001
(Continued)

*Primary Examiner* — Sean Gramling
(74) *Attorney, Agent, or Firm* — Husch Blackwell LLP

(57) ABSTRACT

A lighting device for vehicles with an elongated light guide comprising an end face for the coupling-in of light, into which a light beam radiated from a light source can be coupled-in. The lighting device further comprises elements for the coupling-out of light for the deflection of the coupled-in light beam in the direction of a front skin surface of the elongated light guide, on which the light beam can be coupled-out for the generation of a given light function, such that the front skin surface of the elongated light guide is connected to a rear skin surface by means of a curved dispersion surface. At least one light directing element is arranged between a row of light sources and the light guide so that the light of the light sources arranged in a row can be coupled into the rear skin surface or the curved dispersion surface of the light guide.

10 Claims, 7 Drawing Sheets

Related U.S. Application Data

14/261,282, filed on Apr. 24, 2014, now Pat. No. 9,759,396.

(51) Int. Cl.
| | |
|---|---|
| *F21S 41/25* | (2018.01) |
| *B60Q 1/38* | (2006.01) |
| *F21S 41/143* | (2018.01) |
| *F21S 41/24* | (2018.01) |
| *F21S 41/141* | (2018.01) |
| *F21S 41/26* | (2018.01) |
| *B60Q 1/00* | (2006.01) |
| *B60Q 3/66* | (2017.01) |
| *F21S 41/30* | (2018.01) |

(52) U.S. Cl.
CPC ........... *F21S 41/141* (2018.01); *F21S 41/143* (2018.01); *F21S 41/24* (2018.01); *F21S 41/25* (2018.01); *F21S 41/26* (2018.01); *F21S 41/30* (2018.01)

(56) References Cited

FOREIGN PATENT DOCUMENTS

| | | |
|---|---|---|
| DE | 10231326 A1 | 2/2004 |
| DE | 10314257 A1 | 10/2004 |
| DE | 102004014901 A1 | 7/2005 |
| DE | 102008038668 A1 | 2/2010 |
| DE | 102011119231 A1 | 5/2013 |
| EP | 2384934 A1 | 11/2011 |
| JP | 2010021001 A | 1/2010 |
| WO | 2013030396 A1 | 3/2013 |

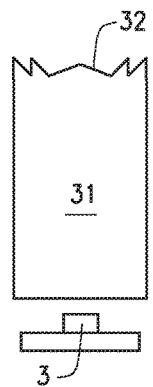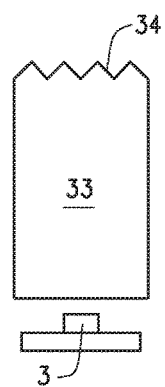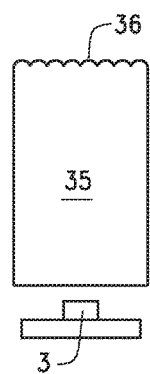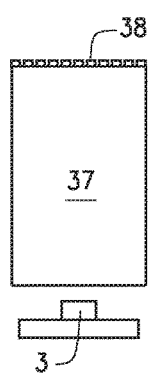
FIG. 12  FIG. 13  FIG. 14  FIG. 15
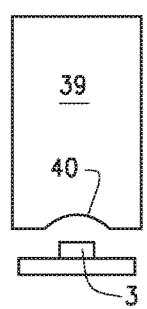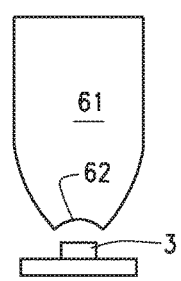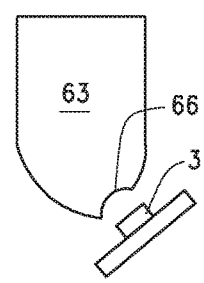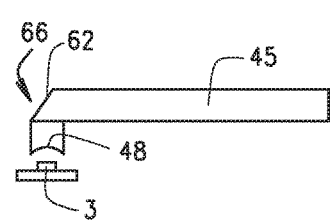
FIG. 16  FIG. 17  FIG. 18  FIG. 19

LIGHTING DEVICE FOR VEHICLES

CROSS REFERENCE

This application claims priority to U.S. Utility application Ser. No. 15/441,309, filed Feb. 24, 2017, which claims priority to U.S. Utility application Ser. No. 14/261,282, filed Apr. 24, 2014, which claims priority to and the benefit of German Patent Application No. 10 2013 104174.4 filed Apr. 25, 2013. The entire disclosures of U.S. Utility application Ser. No. 15/441,309, U.S. Utility application Ser. No. 14/261,282, and German Patent Application No. 10 2013 104174.4 are hereby incorporated herein by reference.

TECHNICAL DESCRIPTION OF THE INVENTION

The invention relates to a lighting device for vehicles with an elongated light guide having a end face for the coupling-in of light, into which a light beam radiated from a light source can be coupled-in, and comprising elements for the coupling-out of light for the deflection of the coupled-in light beam in the direction of a front skin surface of the elongated light guide, on which the light beam can be coupled-out for the generation of a given light function, that the front skin surface of the elongated light guide is connected to a rear skin surface by means of a curved dispersion surface.

From DE 10 2008 038 668 A1, a lighting device for vehicles is known, which comprises an elongated light guide. On a rear skin surface, this light guide has elements for the coupling-out of light, by means of which light coupled into the light guide and guided by it is deflected in the direction of a front skin surface and coupled-out of it for the creation of a given light function. The coupling-in of light is achieved by means of a light source arranged on the end face of the elongated light guide. Therefore, the lighting device allows a line-shaped coupling-out of light, which can for example be used for a direction indicator function. Usually, the light function is accomplished by switching on the light source on the end face, which results in an instant light effect over the entire length of the light guide. There are endeavors to relax the legal requirements relating to the light functions so that the light guide can provide a sequential light radiation in the shape of a wandering light function or a running light function. By this means, the light function of a "wiping" direction indicator can for example be created. This wandering light function can for example be effected by means of the sequential switching-on of light sources arranged in rows, each of which has a separate light guide element arranged in front. If the elongated light guide was segmented or divided into in separate segments, each of which with a light source assigned to it, the light guide would, however, loose the character of a continuous appearance with a homogeneous illumination.

SUMMARY OF THE INVENTION

It is therefore the task of the present invention to further develop a lighting device so that an elongated light guide can be employed in a simple and compact manner for use in a light function in which the lighting of the light guide changes locally in the longitudinal direction of the same while maintaining a continuous appearance of the light guide.

To solve this problem the invention in connection with the preamble of patent claim 1 is characterized in that between a row of light sources and the light guide, a light directing element is arranged so that light from the light sources arranged in a row can be coupled into the rear skin surface or the curved dispersion surface of the light guide.

The particular advantage of the invention is that by means of an elongated light directing element being assigned to an elongated light guide, additional light which can be used for a locally variable lighting of the light guide can be supplied to the elongated light guide in a simple manner. By this means, a wandering light function resp. a wiping direction indicator function can be created, in which the elongated light guide is lit by and by, resp. sequentially from one end face to the opposite end face. The second light beam deflected by the elongated light directing element is supplied in a directed manner to a curved dispersion surface of the elongated light guide, by which it is deflected so that it exits at the front skin surface of the light guide.

According to a preferred embodiment of the invention, the elongated light directing element runs parallel to the light guide so that the second light beam hits exclusively the curved dispersion surface of the elongated light guide. Advantageously, this ensures a defined coupling-in of light from one longitudinal side into the light guide.

According to an embodiment of the invention, the light guide has a trumpet-shaped and symmetrical embodiment, wherein identically formed, curved dispersion surfaces are provided on opposite sides. Advantageously, this allows particularly a dispersion running vertical to the longitudinal mean plane of the light guide.

According to a further development of the invention, the light sources assigned to the light directing element can be switched on and/or off sequentially, so that a locally variable lighting of the light guide is ensured in the longitudinal direction of the same. By this means, the light sources arranged in a row can be switched on one after the other, preferably from an inside of the vehicle toward the outside of the vehicle, until the light guide is lit over its entire length, to create a "wiping direction indicator function". Then the light source arranged on the end face of the light guide is switched on, so that the illuminance of the light guide increases instantly over its entire length. If necessary, the light sources assigned to the light directing element can then be switched off simultaneously. Should the light function be a direction indicator function, the light source assigned to the light guide is switched off after a given time interval and the process can start again. Should the light function be e.g. a tail light, the corresponding light sources remain in the activated condition until the light function is switched off.

According to a further development of the invention, the light directing element is embodied so that the second light beam coupled-in via the curved dispersion surface has the same dispersion as a first light beam, which is coupled into the light guide on the end face and which is deflected via elements for the coupling-out of light of the same in the direction of the front skin surface. Advantageously, the first light beam and the second light beam have therefore the same dispersion effect, particularly across the longitudinal mean plane of the light guide.

According to a further development of the invention, the light directing element is embodied as a reflector having reflector surfaces extending into the vicinity of the dispersion surface. If necessary, the reflector can comprise additional inner reflector surfaces to ensure an improved light output for the coupling-in of the same into the light guide.

According to a further variant of the invention, the light directing element is embodied as a light guide element being arranged as a solid body between the rows of light sources and the light guide. The second light beam being coupled into the light guide element is deflected by means of total reflection on the lateral surfaces of the light guide element toward the light guide.

Preferably, the light guide element has a jaw-shaped embodiment, wherein the second light beam is essentially radiated into an end region of the two jaws of the light guide element in the direction of the dispersion surface.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 12: a lateral view of a light directing element with directed surface for the coupling-out of light.

FIG. 13: a lateral view of the light directing element with prism-shaped surface for the coupling-out of light.

FIG. 14: a lateral view of the light directing element with pillow-shaped optic elements on the surface for the coupling-out of light, FIG. 15: a lateral view of the light directing element with an etched surface for the coupling-out of light, FIG. 16: a lateral view of a light directing element with a coupling-in optics according to a first embodiment, FIG. 17: a lateral view of a light directing element with a coupling-in optics according to a second embodiment, FIG. 18: a lateral view of a light directing element with a coupling-in optics according to a third embodiment, FIG. 19: a lateral view of a light directing element with a coupling-in optics according to a fourth embodiment.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A lighting device for vehicles is arranged in a tail or front region of a vehicle. The lighting device can be used for the creation of a light function, in which the light can be changeably radiated with regard to place and/or time.

Figure 1:
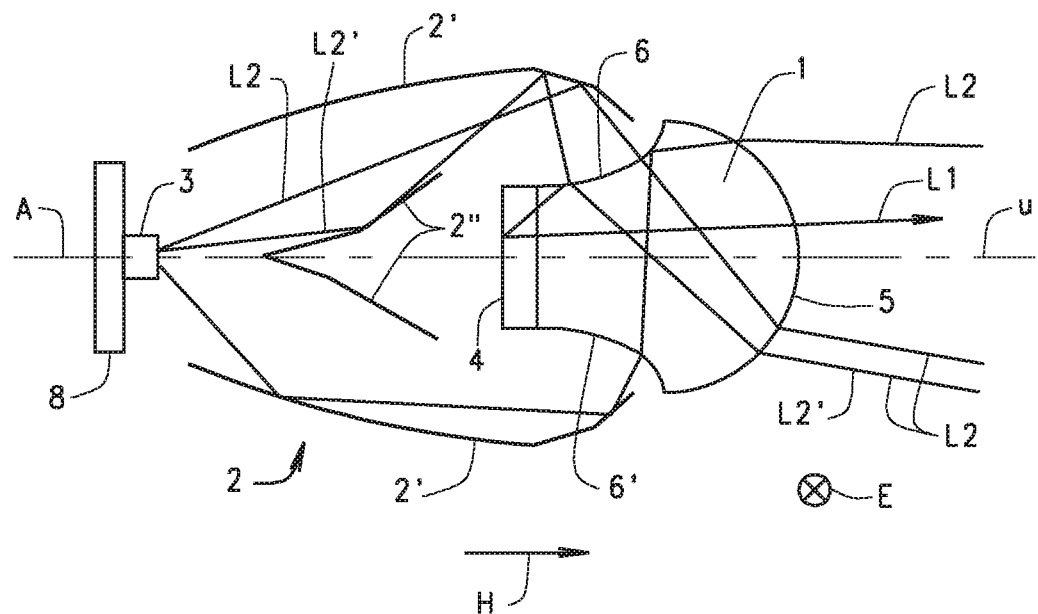
FIG. 1: a schematic lateral view of a lighting device according to a first embodiment of the invention with a light guide element embodied as a reflector.

According to a first embodiment following FIG. 1, the lighting device has an elongated light guide 1 to the rear of which, with regard to the main radiation direction H, a light directing element embodied as a reflector 2 is assigned. The reflector 2, like the light guide 1, has an elongated embodiment and extends preferably in a horizontal direction in parallel to the same. A row of light sources 3 is arranged spaced relative to one another in the longitudinal direction of the reflector 2 on a back of the reflector 2 facing away from the light guide 1.

The cross section of the light guide 1 is trumpet-shaped and has a rear skin surface 4, a front skin surface 5, as well as a curved dispersion surface 6, 6' connecting the rear skin surface 4 with the front skin surface 5. The reflector 2 is symmetrically arranged relative to a longitudinal mean plane M of the light guide 1, wherein the identically shaped dispersion surfaces 6, 6' facing one another connect the narrow rear skin surface 4 having a plane embodiment with the front skin surface 5 having a cylindrical embodiment. On an end face of the light guide 1 which is not represented, a light source is arranged, which radiates a first light beam L1 into the light guide, which is coupled-in at a end face of the light guide 1 and is directed onto the skin surfaces 4, 5, 6, 6' of the light guide 1 in the longitudinal direction E of the same.

The rear skin surface 4 has prism-shaped optic elements as elements for the coupling-out of light 7, by means of which the light beams L1 hitting them are deflected in the direction of the front skin surface 5. These light beams L1 are then coupled-out on the front skin surface 5 for the creation of the light function.

The embodiment of the reflector 2 is preferably symmetrical relative to the longitudinal mean plane M and has outer reflector surfaces 2' and inner reflector surfaces 2". The opposing outer reflector surfaces 2' extend into a region in the vicinity of the curved dispersion surface 6 resp. 6', so that light beams L2 radiated from the light sources 3 are coupled into the curved dispersion surfaces 6, 6' in the light guide 1. The inner reflector surface 2" extends in a region close to the longitudinal mean plane M so that light beams L2' (partial light beams) are reflected in direction of the outer reflector surface 2'. The inner reflector surfaces 2" preferably converge in the longitudinal mean plane M, so that no light L2 radiated from the light sources 3 can directly hit the rear skin surface 4 and/or the curved dispersion surfaces 6, 6'. The light beams L2 exclusively hit the curved dispersion surfaces 6, 6' once they have been deflected once or several times on the outer reflector surface 2'.

Once the light beam L2 has entered the light guide 1, it is deflected by means of the curved dispersion surface 6, 6' so that it is coupled out on the front skin surface 5 in the main radiation direction H. Herein, the dispersion of the second light beam L2 preferably has the same dispersion as the first light beam L1. The light dispersion, particularly in the vertical direction, is therefore identical.

The reflector surfaces 2', 2" can have a smooth surface or an optical structure. The optical structure can for example be embodied as pillow optics or striped optic elements. Alternatively, the optical structure can also be achieved by means of erosion or etching or lasering.

The reflector 2 can be fastened in a carrier element or a bezel of the lighting device in which the light guide 1 is held.

According to the first embodiment corresponding to FIG. 1 the light sources 3 are embodied as LED light sources being arranged on a common rigid carrier plate 8.

Figure 2:
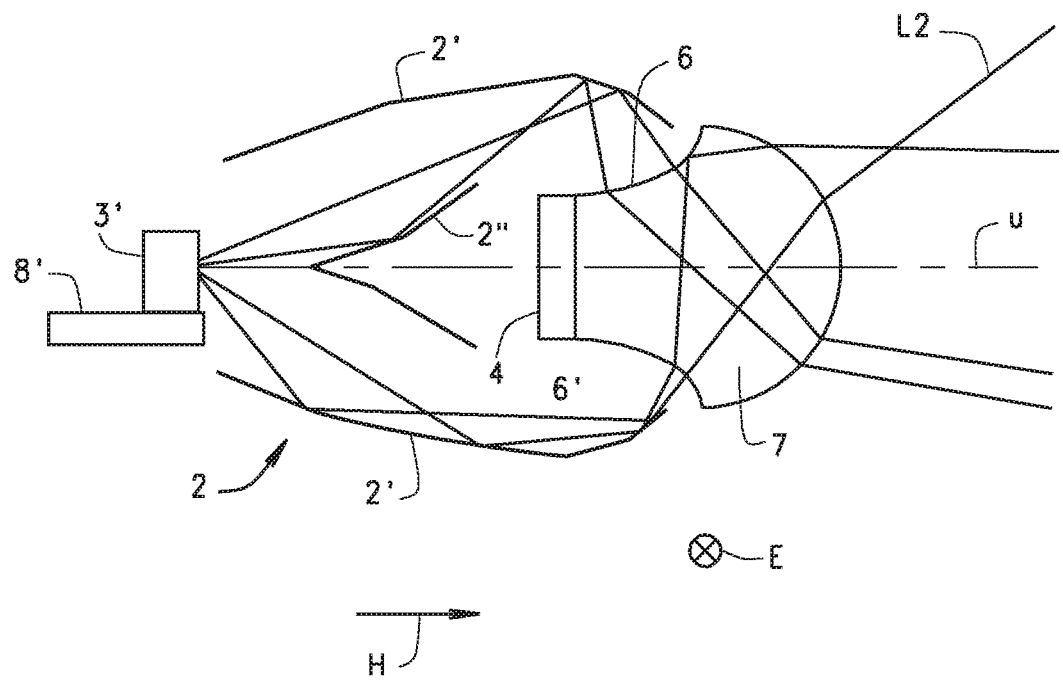
FIG. 2: a schematic lateral view of a lighting device according to FIG. 1 with an alternative light source arrangement according to a second embodiment.
Figure 3:
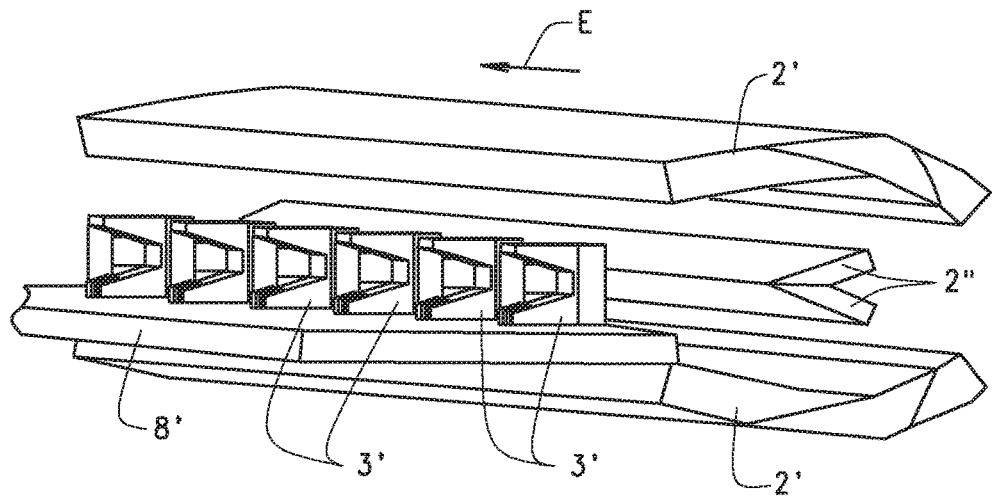
FIG. 3: a perspective representation of the lighting device according to FIG. 2 without representation of a light guide.
Figure 4:
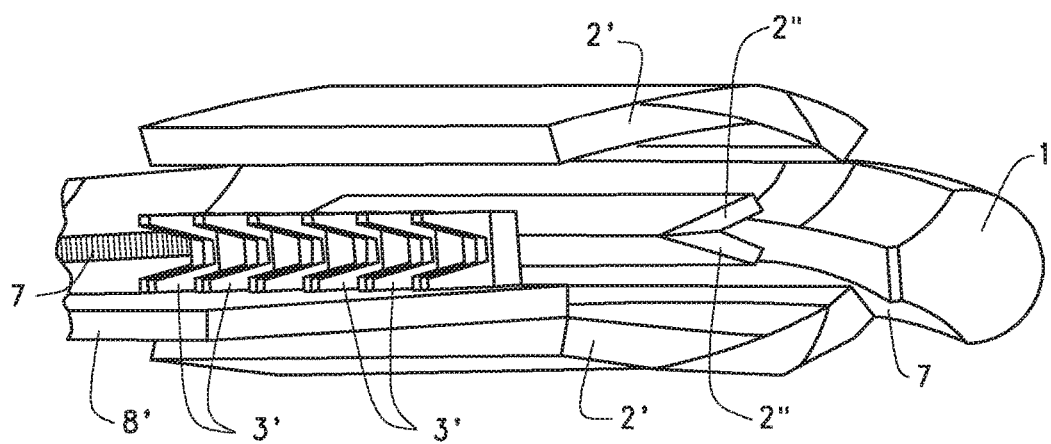
FIG. 4: a perspective representation of the lighting device according to FIG. 2 with the light guide shown.

According to a second embodiment of the invention corresponding to FIGS. 2 to 4, and in contrast to the first embodiment, a row of lateral-LED-light sources 3' can be assigned to the reflector 2. In contrast to the first embodiment, these are not arranged on a printed circuit board running vertical to the longitudinal mean plane M, but on a printed circuit board 8' running parallel to the longitudinal mean plane M, resp. parallel to the main radiation direction H.

Identical components resp. identical component functions of the exemplary embodiments are marked with identical reference signs.

According to a represented alternative embodiment, the light sources can also be embodied as OLED light sources, in which the light beam L2 is not radiated in a punctiform manner, as described in the above embodiments, but from a lighting panel.

Figure 5:
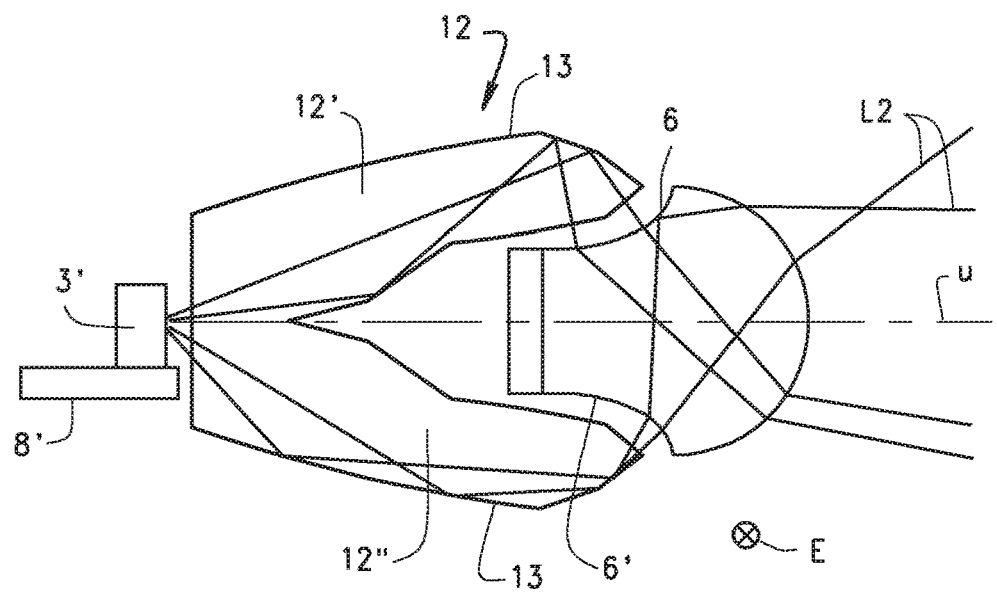
FIG. 5: a lateral view of a lighting device according to a third embodiment with a light directing element embodied as a light guide element.

According to a further embodiment of the invention according to FIG. 5, the light directing element can be embodied as a light guide element 12 extending as a solid body between the row of light sources 3' and the light guide 1. The light guide element 12 has a jaw-shaped cross-section and has two light guide legs 12', 12" extending on both sides of the longitudinal mean plane M. The front ends of the light guide legs 12', 12" extend into a region in the vicinity of the curved dispersion surface 6, 6'. The two light guide legs 12', 12" each have outer lateral surfaces 13 and inner lateral surfaces 14, on which the coupled-in light beam L2 can be fully reflected. In a free end region of the light guide legs 12', 12" the light beams L2 are coupled-out on the inner lateral surfaces 14, so that they can enter the light guide 1 through the curved dispersion surfaces 6, 6'. Subsequently a deflection, already described above, occurs inside the light guide 1, so that they are coupled-out on the front skin surface 5 in the main radiation direction H in an identical manner.

To switch the lighting device on, the light sources 3, 3' are sequentially switched on by means of a control device which is not represented, starting preferably from an innermost side of the vehicle toward an outermost side of the vehicle. By this means, light L2 is, by and by, coupled into the light guide 1 in the longitudinal direction E by means of the light directing element 2, 12 and radiated from its front skin surface 5. This results in a wandering light function resp. a light strip which is extended by and by along the longitudinal direction E of the light guide 1. A wiping effect is created, which can for example be used when a direction indicator function, a tail light function or a daytime running light function is switched on.

Figure 6:
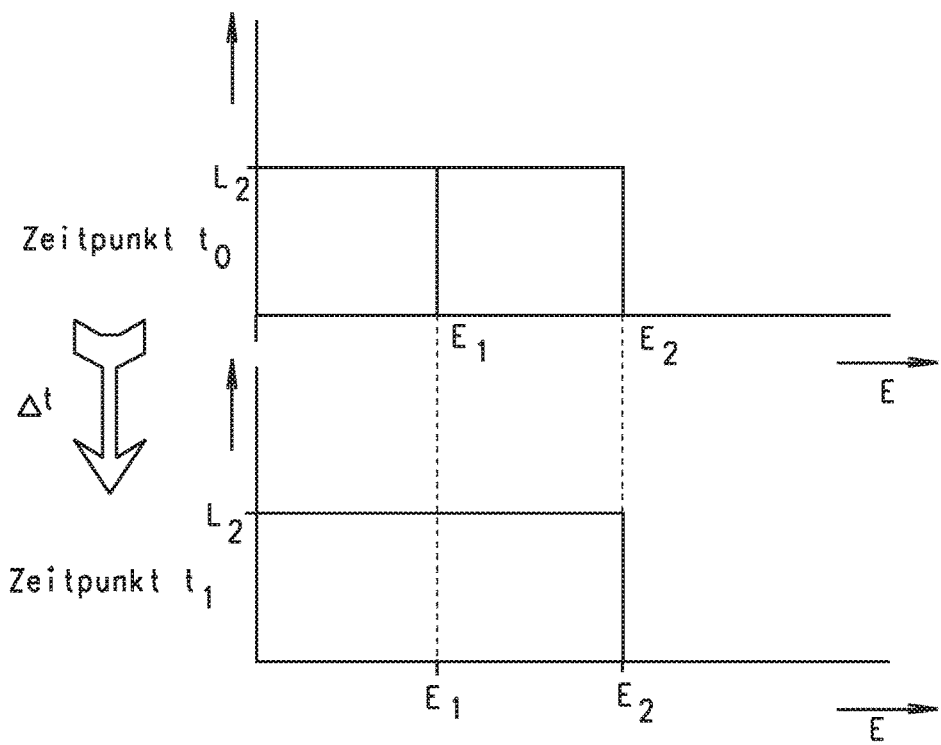
FIG. 6: a schematic representation of the switching process of the additional light sources arranged in a row in the longitudinal direction of the light guide.

FIG. 6 gives a schematic representation of the light radiated from the light guide 1 in the longitudinal direction E against the switching points. At the beginning of the switching process, a light source 3, 3' preferably facing the vehicle inside is switched on at the point in time $t_0$, so that a light radiation L2 is effected in the longitudinal direction E across a first partial section E1 of the light guide 1. At the end of a time interval $\Delta t$, the neighboring light source 3, 3' is switched on in addition, so that an illumination of the light guide 1 across a partial section E2 being larger than the partial section E1 is effected. Subsequently, further light sources 3, 3' are switched on sequentially in addition at time intervals of $\Delta t$, until the light guide 1 is lit across its entire extension. The light guide 1 then radiates the light L2 provided by the light directing element 2, 12 across its entire length. The process of switching on the light sources 3, 3' is thus completed. Subsequently, the first light beam L1 of the light source situated on the front-side surface for the coupling-in of light of the light guide 1 can be radiated via the front skin surface 5 in addition by switching it on, so that an increase in illuminance is created across the entire length of the light guide 1. Either the light sources 3, 3' assigned to the light directing elements 2, 12 can remain switched on or they are switched off so that the light guide 1 is illuminated exclusively by the first light beam L1.

For the creation of the direction indicator function, the light sources 3, 3' assigned to the light directing element 2, 12 as well as the light sources assigned to the light guide 1 are switched off simultaneously after the lapse of a given time interval, so that after a given pause, the described switching process can start again. The switching on of the lighting device therefore effects the creation of a light strip extending in the longitudinal direction, the light strip being determined by the extension of the light guide 1.

The light guide 1 and the light directing element 2, 12 may have a straight or a curved shape.

The light sources 3, 3' have main axes A, which run in the main radiation direction H resp. vertically to the longitudinal direction E of the light guide 1 resp. the light directing element 2, 12. The light sources 6, 6' are preferably arranged at identical distances. The light source assigned to the light guide 1 being arranged on the end face for the coupling-in of light of the same has a main axis running vertical to the main radiation direction H resp. in the direction of the longitudinal direction E of the light guide 1, if the light guide 1 has a straight shape. If the light guide 1 has a curved shape, the main axis of this light source is preferably arranged in the direction of a normal of the surface for the coupling-in of light at the end face of the light guide 1.

Figure 7:
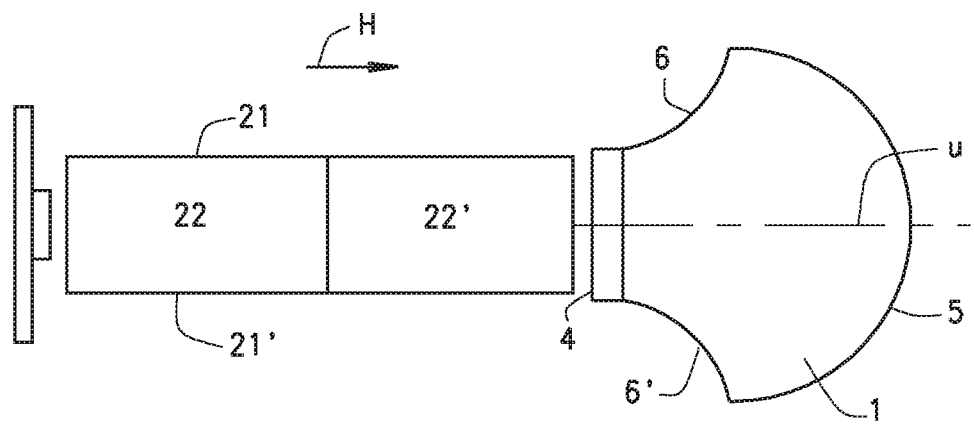
FIG. 7: a lateral view of the lighting device according to a further embodiment with an intermediate lens.
Figure 8:
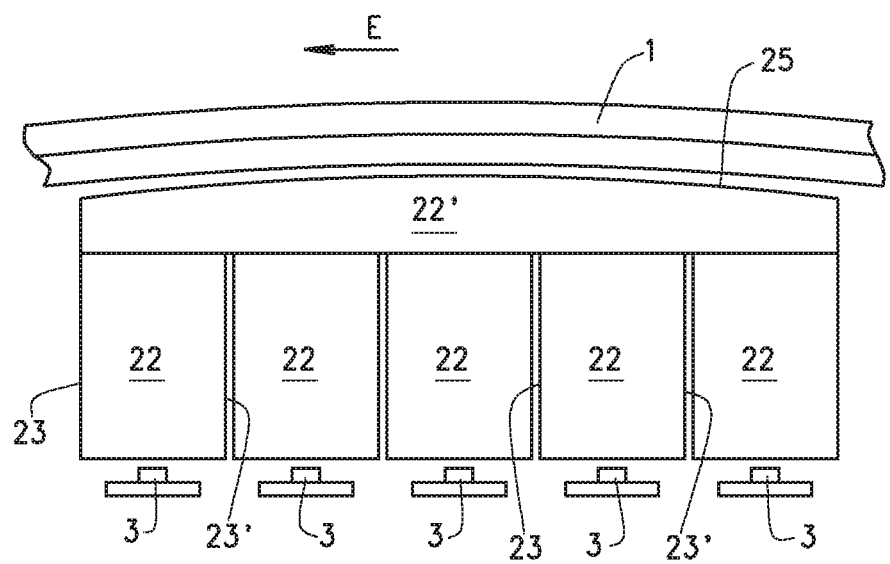
FIG. 8: a top view of the embodiment according to FIG. 7, FIG. 9: a top view of an embodiment with a light directing element which is continuous in the longitudinal direction.

According to a further embodiment of the invention according to the FIGS. 7 and 8, a light directing element arranged between the row of light sources 6 and the light guide 1 can be embodied as an essentially cuboidal light guide element 22 and followed by an intermediate lens 22' arranged in the same main radiation direction H. The light guide element 22 is segmented and has narrow sides 23, 23' facing away from each other. Parallel to the longitudinal mean plane M of the light guide 1, the light guide element 22 is limited by opposing flat sides 24, 24'. On a front side facing the light guide 1, the light guide elements 22 are each monolithically connected with the continuous intermediate lens 22' in the longitudinal direction E. The intermediate lens 22' has a contour 25 following the course of the light guide 1, on which the light L2 is coupled-out in the direction of the rear skin surface 4 of the light guide 1. In this execution of the invention, the light beam L2 is exclusively coupled-in on the rear skin surface 4 of the light guide 1. The rear skin surface 4 has preferably a prism-shaped structure as coupling-out elements, which on one hand allows a deflection of the light L1 coupled-in in the longitudinal direction E of the light guide 1 toward the front skin surface 5, and on the other hand allows an entrance of the second light beam L2.

Figure 9:
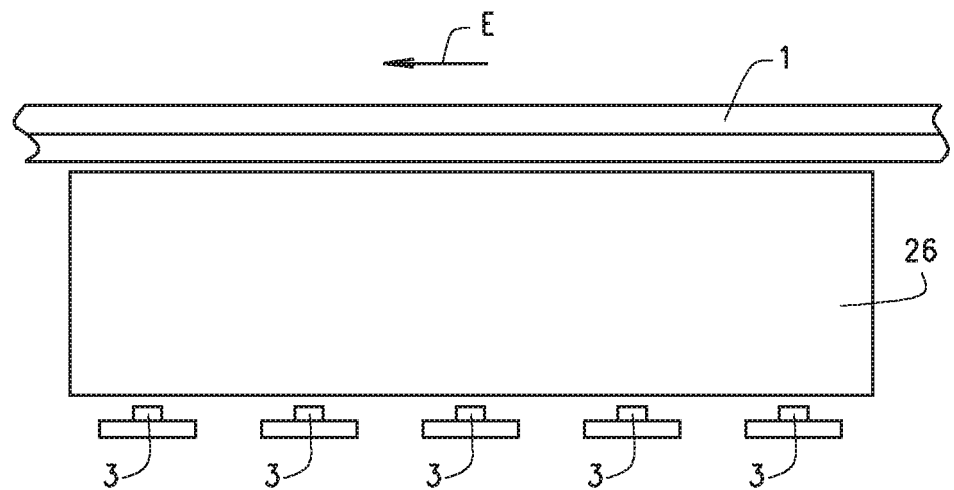

According to a further embodiment of the invention according to FIG. 9, a light guide element 26 can be embodied continuously in the longitudinal direction E. Optionally, the intermediate lens 22' can be omitted.

Figure 10:
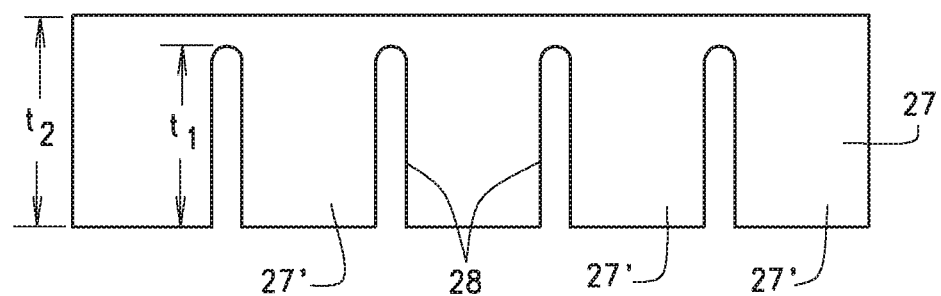
FIG. 10: a top view of a light directing element having slots.

According to a further embodiment of the invention according to FIG. 10, a light guide element 27 can have slots 28 having a depth t1 being smaller than a depth t2 of the monolithically embodied light element 27. The slots 28 extend from a side on which the light is coupled-in of the light directing element 27 in the direction of a side for the coupling-out of light of the same without it being reached. The light guide segments 27' separated in this manner are each assigned to a light source 3.

Figure 11:
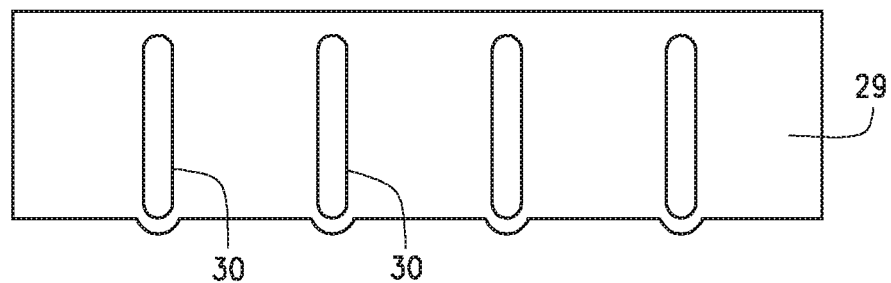
FIG. 11: a top view of a light directing element having closed slots.

According to a further embodiment of the invention according to FIG. 11, a light guide element 29 can be provided, which has closed slots 30 in contrast to the light guide elements 27 according to FIG. 10.

On a side for the coupling-out of light facing the light guide 1, a light guide element 31 can have a directed optic structure 32, for example a Fresnel structure.

Alternatively, a light guide element 33 can also have a prism-shaped structure 34 on the side for the coupling-out of light. Alternatively, a light guide element 35 can also have an optical structure provided with pillow-optics elements 36 on the side for the coupling-out of light. Alternatively, a light guide element 37 can also have an etched or lacquered structure 38 on the side for the coupling-out of light.

According to a variant of the invention, a light guide element 39 can have a concave depression 40 on a side for the coupling-in of light. According to a further alternative according to FIG. 17, a light guide element 41 can be embodied tapered in the direction of the side for the coupling-in of light, wherein a depression 42 is assigned to the LED light source 3. Depending on the installation space, the LED light source 3 can also be arranged at an angle, for example 45 degrees, relative to a longitudinal direction of a light guide element 43. To this end, the light guide element 43 has a lateral depression 44 on the side for the coupling-in of light. According to a further embodiment of the invention according to FIG. 19, the light source 3 can also be arranged at a right angle relative to the longitudinal direction of a light guide element 45. The light guide element 45 has a deflecting nose 46 comprising a refection surface 47, on which the light L2 coupled-in via a depression 48 is deflected in the longitudinal direction of the light guide element 45.

Figure 20:
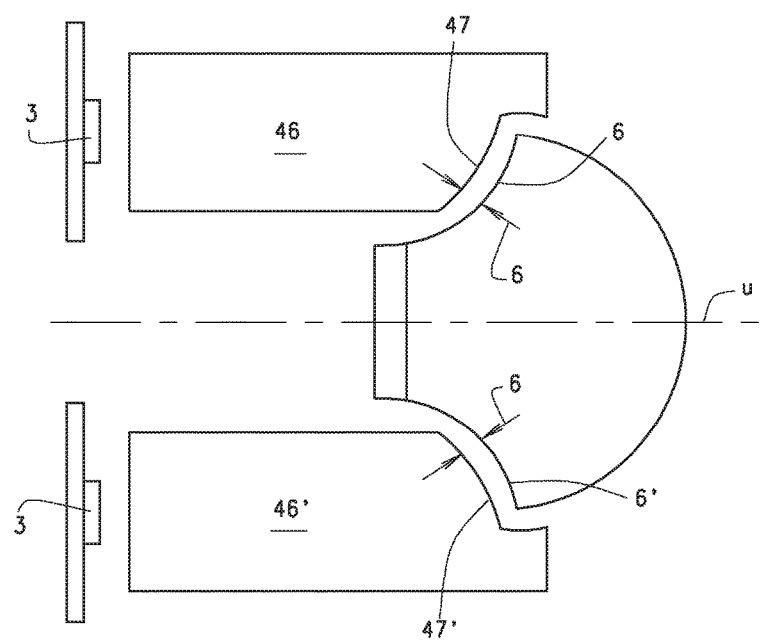
FIG. 20: a lateral view of a lighting device with two light directing elements.

According to a further embodiment of the invention according to FIG. 20, plate-shaped light guide elements 46, 46' are arranged on both sides of the mean plane M of the light guide 1, each of which has a row of light sources 3 assigned on a side for the coupling-in of light. The light guide elements 46, 46' each have a curved surface for the coupling-out of the light 47, 47' on the side for the coupling-out of light, following the contour of the curved dispersion surface 6, 6' of the light guide. Preferably, there is a constant distance b between the contour of the surface for the coupling-out of light 47, 47' on one hand and the curved dispersion surface 6, 6' on the other hand.

LIST OF REFERENCE SIGNS

1 Light guide
2, 2', 2" reflector external, internal
3, 3' Light source
4 Rear skin surface
5 Front skin surface
6, 6' Curved dispersion surface
7 Elements for the coupling-out of light
8, 8' Carrier plate
9
10
11
12, 12', 12" Light guide legs
13 Outer lateral surfaces
14 Inner lateral surfaces
22, 22' Light guide element/intermediate lens
23, 23' Narrow sides
24, 24' Flat sides
25 Contour
26 Light guide element
27 Light guide element
28 Slots
29 Light guide element
30 Slot
31 Light guide element
A Axis
H Main radiation direction
M Longitudinal mean plane
E Longitudinal direction
L1, L2 Light beam

What is claimed is:

1. A lighting device for vehicles comprising:
   an elongated light guide including:
      an end face for the coupling-in of light, into which a light beam radiated from a light source can be coupled-in, and
      elements for the coupling-out of light for the deflection of the coupled-in light beam in the direction of a front skin surface of the elongated light guide, on which the light beam can be coupled-out for the generation of a given light function,
   a curved dispersion surface connecting the front skin surface of the elongated light guide to a rear skin surface of the elongated light guide, and
   at least one light directing element located between a row of light sources and the light guide so that light from the light sources arranged in a row can be coupled into the rear skin surface of the light guide, and
   wherein the at least one light directing element is embodied as a cuboidal light guide element extending between the row of light sources and the elongated light guide.

2. The lighting device according to claim 1, wherein the light sources assigned to the elongated light directing element can be sequentially switched on or off for the creation of an illumination which is locally changeable in the longitudinal direction of the light guide.

3. The lighting device according to claim 1, wherein a second light beam coupled into a surface for the coupling-in of light of the light guide element facing the light sources can be deflected in direction of the light guide by means of total reflection on the lateral surfaces of the light guide element.

4. The lighting device according to claim 1, wherein the light directing element is segmented in the longitudinal direction.

5. The lighting device according to claim 1, wherein the light directing element is continuous in the longitudinal direction.

6. The lighting device according to claim 1, wherein the light directing element has open slots or closed slots on the side facing the row of light sources.

7. The lighting device according to claim 1, wherein on both sides of a median plane of the light guide, there are light directing elements arranged, each of which has a row of light sources assigned on a surface for the coupling-in of light facing away from the light guide and each of which has, on the side for the coupling out of light facing the light guide, a surface for the coupling-out of light following the contour of the curved dispersion surface of the light guide.

8. The lighting device according to claim 1, wherein an intermediate lens is positioned and located between the light guide element and the elongated light guide.

9. The lighting device according to claim 8, wherein the intermediate lens is cuboidal.

10. The lighting device according to claim 8, wherein the intermediate lens abuts the light guide element.

* * * * *